3,780,178
Patented Dec. 18, 1973

3,780,178
FUNGICIDAL COMPOSITIONS AND METHODS OF KILLING FUNGI USING ALKYLENIMINE-2-OXIMES
Marvin Theodore Tetenbaum, Convent, N.J., assignor to Allied Chemical Corporation, New York, N.Y.
No Drawing. Filed Dec. 14, 1971, Ser. No. 207,959
Int. Cl. A01n 9/12, 9/22
U.S. Cl. 424—244          3 Claims

ABSTRACT OF THE DISCLOSURE

Alkylenimine-2-oximes having the general formula:

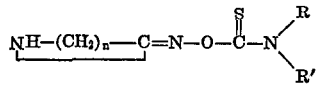

wherein $n$ is 2 to 10 and R and R' are selected from the group consisting of hydrogen, alkenyl, alkyl, cycloalkyl, aryl, and substituted aryl, are effective on controlling soil nematodes and plant diseases caused by microorganisms such as plant pathogenic fungi.

BACKGROUND OF THE INVENTION

This invention relates to novel derivatives of alkylenimine-2-oximes particularly useful as fungicides and nematocides. Over the past few years, a large number of chemical fungicides have been placed on the market; but despite the increasing number of fungicides, there remain problems for which none or few fungicides are appropriate. For example, a few fungicides are available which show broad spectrum soil fungicidal activity, particularly at low concentrations of say 100–1000 parts per million of diluent.

Moreover, there are very few soil fungicides that are also useful as soil nematocides and foliar fungicides.

These deficiencies of known fungicides have resulted in an intensive search by the agricultural chemical industry for new compounds having superior fungicidal activity. Research has particularly centered on finding compounds which show both fungicidal and nematocidal activity. The agricultural and economic benefit to be derived from use of a combination fungicidal and nematodical compound is readily apparent.

SUMMARY OF THE INVENTION

In view of the forgeoing, it is an object of the present invention to provide a novel class of derivatives of alkylenimine-2-oximes which are effective in controlling soil nematodes as well as plant diseases caused by microorganisms such as plant pathogenic fungi.

It is a further object of the present invention to provide a broad spectrum soil fungicide which is also useful as a foliar fungicide.

Another object is to provide a process for controlling nematodes and fungi harmful to plant life.

These and other objects and advantages which will be obvious hereinafter are achieved by the present invention which is set forth in the following description wherein parts and percentages are by weight.

The novel compounds of the instant invention employed as new agriculturally useful nematocides and broad spectrum fungicides have the general formula

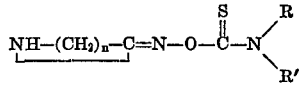

wherein $n$ is 2 to 10 and R and R' may be hydrogen, alkyl, alkenyl, cycloalkyl, aryl or substituted aryl. The aryl substituent may be halogen, or lower alkyl.

Particularly interesting compounds for use in the invention are those in which $n$ is 3 to 7, R is hydrogen, and R' is phenyl or alkyl having 1 to 6 carbon atoms in the formula given above.

The novel compounds of the present invention are preferably prepared by reacting an equimolar mixture of the desired alkylenimine-2-oxime with an isothiocyanate in an inert solvent such as dimethylformamide. A catalyst such as triethylamine is preferably used. A reaction time of 1–10 hours is generally sufficient at ambient temperatures. The solvent may be removed from the product under reduced pressure or by other conventional procedures.

The alkylenimine-2-oximes of use in the preparation of the compounds of the invention are also known as lactam oximes. They may be synthesized by means taught in the art, for example, H, Behringer and H. Meier, Annaler der Chemie (Justus Liebigs), 607, 67–80 (1957). Several alkyl isothiocyanates, including methyl isothiocyanate and ethyl isothiocyanate, are commercially available. A practical method of synthesis is the reaction of the desired alkylamine with carbon disulfide to form the alkylammonium salt of the alkyldithiocarbamic acid. The elimination of hydrogen sulfide from these salts by basic lead acetate produces the isothiocyanate.

The compounds of the invention are effective soil fungicides, especially for protecting seeds and seedlings from pre-emergence and post-emergence damping-off caused by plant pathogenic soil organisms. In particular, the compounds possess broad spectrum soil fungicidal activity against such soil pathogens as *Sclerotium rolfsii*, *Pythium ultimum*, and *Rhizoctonia solani*. Moreover, fungicidal activity against these soil pathogens is superior to that of known reference standards conventionally used against each pathogenic fungus. In addition, the compounds of the present invention show activity against soil nematodes. For example, at concentrations useful against soil fungi up to 90% cotnrol of root knot nematode has been demonstrated.

The compounds of the invention also show significant activity as a foliar fungicide. For example, the compounds have exhibited excellent foliar fungicidal control of leaf rust of wheat, *Puccinia rubigo-vera,* and rice blast disease, *Piricularia oryzae.*

Normally, the instant compounds will be as the active ingredient in a fungicidal-nematocidal composition, although they may also be used without a carrier. Various diluents and carriers may be employed and the percent of active ingredient may be varied. Although compositions containing less than 0.05 percent by weight of active ingredient may be used, it is desirable to use compositions containing at least about 0.1 percent of active ingredient because otherwise the amount of carrier becomes excessively large. Activity increases with the concentration of active ingredient, which may be 10, 50, 95 percent or even higher.

The amount of composition which is applied for effective nematocidal or fungicidal action is dependent upon considerations such as the type of organism to be killed, the degree of infection, and the soil and climatic conditions. Usually sufficient composition will be applied to provide about 0.1–100 pounds of active ingredient per acre.

The instant nematocidal and fungicidal compositions may be in the form of a solution, with the solvent being selected from acetone, methanol and the like. These solutions can be applied in a direct manner such as spraying, sprinkling, etc. Liquid suspensions can also be applied in this manner, with the dispersant selected from the liquids such as water and the like.

Application can also be achieved by dusting a powder in which the active ingredient is dispersed. Suitable carriers include powdered material such as clay, fuller's earth, and talc.

The instant compounds may constitute the sole active ingredient in the nematocidal and fungicidal compositions, but they may be effectively used in combination with other active ingredients such as plant treating agents.

As a soil fungicidal-nematocidal composition, the instant compounds may be applied as a dust or spray to the furrows with the planting of the seeds. The amount of chemical applied to the seed rows will be from 0.1 to 10 pounds per acre applied to the seed rows the equivalent to an area 2 inches wide and 2 inches deep to parallel rows in one direction a distance of about 20 to 40 inches apart. Also as a soil fungicidal-nematocidal composition, the instant compounds may be applied to the seeds with a conventional surface-active wetting agent, with or without additional solid carrier. Also, the soil fungicidal-nematocidal composition may be applied broadcast as a dust or spray with an application rate of 1–100 pounds of active ingredient per acre. As a foliage fungicide, the instant compounds may be applied to growing plants at a rate of 0.25 to 10 pounds per acre. Foliar application is generally as an aqueous spray containing say 1000 parts per million active ingredient. The compounds may be prepared for aqueous spraying by dissolving in a suitable solvent such as acetone and diluting with water to the desired concentration.

DESCRIPTION OF THE PREFERRED EMBODIMENT

In order to demonstrate the invention, the following examples are given. They are provided for illustrative purposes only and are not to be construed as limiting the scope of the invention, which is defined by the appended claims.

EXAMPLE 1

The following example shows the preparation of O-(N-methylthiocarbamoyl)-hexamethylenimine-2-oxime, which has the formula:

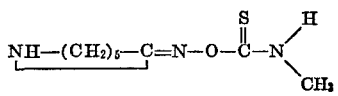

An equimolar mixture of hexamethylenimine-2-oxime and methyl isothiocyanate plus a catalytic amount of triethylamine was stirred in eight times its weight of dimethylformamide overnight at 25° C. The solids dissolved rapidly. Rotary evaporation at 55° C. and hexane washing of the residue produced a tan solid that was chromatographed over silica (eluting with chloroform), and recrystallized from chloroform-hexane. The final product was in the form of almost white needles, M.P. 135.5–136° C. The purified yield was 83.2%.

*Analysis.*—Calculated for $C_8H_{15}N_3OS$ (percent): C: 47.74; H: 7.51; N: 20.88; S: 15.93. Found (percent): C: 47.62; H: 7.58; N: 20.69; S: 15.82.

For convenience, this product may be called Product A. As demonstrated hereinafter, Product A is highly effective in controlling soil nematodes and plant diseases caused by microorganisms such as plant pathogenic fungi.

EXAMPLE 2

In accordance with the procedure used for preparing Product A above, the following compounds useful in the invention may be prepared:

O-(N-ethylthiocarbamoyl)-hexamethylenimine-2-oxime,
O-(N-isobutylthiocarbamoyl)-hexamethylenimine-2-oxime,
O-(N-methylthiocarbamoyl)-pentamethylenimine-2-oxime,
O-(N-phenylthiocarbamoyl)-hexamethyleneimine-2-oxime,
O-(N-dimethylthiocarbamoyl)-hexamethyleneimine-2-oxime.

EXAMPLE 3

Product A of Example 1 was tested as a foliar fungicide as follows:

Test Procedure A

Leaf rust of wheat, protectant, *Puccinia rubigo-vera*

Cheyenne wheat plants, *Triticum vulgare*, approximately seven to eight days old and four to five inches tall are mounted on a compound turntable and sprayed at 40 pounds pressure for 60 seconds with the candidate compound at concentrations of 100–1000 parts per million. The candidate compound is prepared for spraying by dissolving in acetone and diluting to desired concentration with deionized water containing wetting and dispersing agents.

After drying, treated plants are dusted with spores of *Puccinia rubigo-vera* directly from diseased plants and then immediately placed in an incubation chamber maintained at 70° F. and 95% plus relative humidity. After 24 hours incubation period, plants are removed to the greenhouse for disease development. Control effectiveness is determined by actual count of the number of developed pustules appearing in the respective treatments compared directly to equivalent developed pustules developing on inoculated but otherwise untreated controls. All units of test include a minimum of three replicates.

According to Test Procedure A, Product A of Example 1 exhibited excellent foliar fungicidal control of leaf rust of wheat at concentrations of 500–1000 parts per million. There was no plant injury. Percent control is indicated in the following table:

Control of leaf rust of wheat

Compound—Product A of Example 1

| Concentration (p.p.m.): | Percent control |
| --- | --- |
| 1000 | 96 |
| 500 | 99 |
| 250 | 0 |

Test Procedure B

Rice blast disease, protectant *Piricularia oryzae*

Rice blast disease, protectant *Piricularia oryzae* are mounted on a compound turntable and sprayed at 40 pounds pressure for 60 seconds with the candidate compound at concentrations of 100–1000 parts per million. Approximately 150 ml. of test solution are delivered. Candidate sample is prepared for spraying by dissolving in acetone and diluting to desired concentration with deionized water containing wetting and dispersing agents.

After drying, treated plants are spray-inoculated at 30 pounds pressure with an aqueous spore suspension of *Piricularia oryzae* and then immediately placed in an incubation chamber maintained at 70° F. and 95% plus relative humidity. After 24 hours incubation time, plants are removed to the greenhouse for disease development. Infection lesions are sufficiently developed within five days after inoculation to permit assessment of control. Effectiveness of treatment is determined by direct comparison of the number of infection lesions appearing on the respective treated plants compared directly with those lesions appearing on untreated inoculated controls. All units of test include a minimum of three replicates.

According to Test Procedure B, Product A of Example 1 exhibited excellent foliar fungicidal control of rice blast disease at concentrations of 250–1000 parts per million but control declined rapidly at 100 parts per million.

There was no plant injury. Percent control is indicated in the following table:

Control of rice blast disease

Compound—Product A of Example 1

| Concentration (p.p.m.) | Percent control |
|---|---|
| 1000 | 100 |
| 500 | 100 |
| 250 | 99 |
| 100 | 37 |

EXAMPLE 4

Product A of Example 1 showed unusual broad spectrum soil fungicidal activity against *Sclerotium rolfsii*, *Pythium ultimum* and *Rhizoctonia solani*. Tests were conducted as follows:

Test Procedure C

*Sclerotium rolfsii*, protectant

Sufficient sclerotia of *Sclerotium rolfsii* to effect twice the desired fungal concentration are added on dry weight basis to sterile soil, placed in a sealed soil blender and blended therein.

Candidate compound dissolved in acetone is added at concentrations to effect 12–100 pounds per acre, twice the desired chemical concentration, to a unit of sterilized soil in a sealed soil blender and blended therein. Chemically-treated soil is then added to an equivalent unit of Sclerotium-inoculated soil, placed in the soil blender and blended therein. Resulting blend of Sclerotium-inoculated and chemically-treated soil is divided equally into suitable containers, implanted with two carrot slices, water sealed to prevent loss of potential chemical vapor phase and removed for subsequent observation.

Controls include sterile soil, sterile soil plus chemical, and sterile soil plus Sclerotium inoculum.

Control effectiveness of the candidate compound is determined by actual count of infection loci on carrot slices in chemically-treated soil compared to equivalent counts on carrot slices in Sclerotium-inoculated soil. All units of test include a minimum of three replicates.

According to Test Procedure C, Product A of Example 1 showed excellent fungicidal activity. Data are shown in the following table:

Control of *Sclerotium rolfsii*

Compound tested—Product A of Example 1

| Concentration, pounds/acre: | Control, percent |
|---|---|
| 50 | 95 |
| 25 | 93 |
| 12 | 75 |
| 6 | 0 |

Test Procedure D

Damping off organisms, protectant pythium species

Oospore suspensions of *Pythium ultimum* examined with haemocytometer for oospore (plus chlamydospore) numbers per ml., are blended with dry sterilized soil in concentration to effect twice the desired fungal concentration (1000 oospores per gram of soil on a dry weight basis).

Candidate compound dissolved in acetone is added at concentration to effect 12–100 pounds per acre, twice the desired chemical concentration, to a unit of sterilized soil in a sealed soil blender and blended therein. Chemically-treated soi is then added to an equivalent unit of Pythium-inoculated soil, placed in the soil blender and blended therein. Resulting blend of Pythium-inoculated and chemically-treated soil is divided equally into suitable containers, seeded with cotton seeds or other suitable plant species, water sealed to prevent loss of potential chemical vapor phase and removed to the greenhouse.

Controls include sterile soil, sterile soil plus chemical, and sterile soil plus Pythium inoculum. Control effectiveness of the candidate compound is determined by actual count of surviving plants in respective treatments compared to equivalent counts in Pythium-inoculated soil. All units of test include a minimum of three replicates.

According to Test Procedure D, Product A of Example 1 showed excellent fungicidal activity. Data are shown in the following table:

Control of *Pythium ultimum*

Compound tested—Product A of Example 1

| Concentration, pounds/acre: | Control, percent |
|---|---|
| 50 | 97 |
| 25 | 72 |
| 12 | 66 |
| 6 | 64 |

Test Procedure E

*Rhizoctonia solani*, protectant

Sufficient *Rhizoctonia solani* inoculum to effect twice the desired fungal concentration is added on a dry weight basis to sterile soil, placed in a sealed soil blender and blended therein.

Candidate compound dissolved in acetone is added at concentrations to effect 12–100 pounds per acre, twice the desired chemical concentration, to a unit of sterilized soil in a sealed soil blender and blended therein. Chemically-treated soil is then added to an equivalent unit of Rhizoctonia-inoculated soil, placed in the soil blender and blended therein. Resulting blend of Rhizoctonia-inoculated and chemically-treated soil is divided equally into suitable containers, seeded with snap bean seeds or other suitable plant species, water sealed to prevent loss of potential chemical vapor phase and removed to the greenhouse.

Controls include sterile soil, sterile soil plus chemical, and sterile soil plus Rhizoctonia inoculum.

Control effectiveness of the candidate compound is determined by a disease rating based on a zero (no disease present) to five (equivalent to 100% diseased) scale. All units of test include a minimum of three replicates.

According to Test Procedure E, Product A of Example 1 showed satisfactory fungicidal activity at all levels of application tested with no phytotoxicity.

EXAMPLE 5

Product A of Example 1 showed significant nematocidal activity against *Meloidogyne incognita*. The test was conducted as follows:

Test Procedure F

*Meloidogyne incognita*, protectant, soil treatment

Sufficient nematode-infested soil to effect twice the desired nematode concentration is added on a dry weight basis to sterile soil, placed in a sealed soil blender and blended therein.

Candidate compound dissolved in acetone is added at concentrations to effect 12–100 pounds per acre, twice the desired chemical concentration, to a unit of sterilized soil in a sealed soil blender and blended therein. Chemically-treated soil is then added to an equivalent unit of nematode-infested soil, placed in the soil blender and blended therein.

Bonny Best tomato plants approximately three to four weeks old with root development adequate to hold the soil ball intact are removed undisturbed and completely embedded in four inch pots nematode infested chemically-treated soil.

Controls include sterile soil, sterile soil plus chemical, and sterile soil plus nematodes.

Control effectiveness of the candidate compound is determined by actual count of knots appearing in the root system in chemically-treated soil compared to equivalent counts on root systems in nematode-infested soil. All units of test include a minimum of three replicates.

According to Test Procedure F, Product A of Example 1 showed 91% control of *Meloidogyne incognita* at soil application rate of 50 pounds per acre; 82% control at 25 pounds per acre; 90% control at 12 pounds per acre; and 65% control at 6 pounds per acre. There was no evidence of phytotoxicity on the tomato plants.

I claim:

1. A fungicidal composition comprising a suitable carrier and as the active ingredient a fungicidally effective amount of a compound of the formula

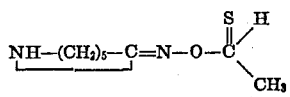

2. A method of controlling fungi which comprises applying thereto a fungicidally effective amount of a compound of the formula

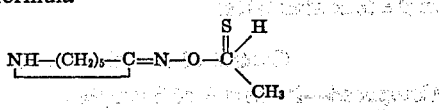

3. A method of controlling fungi harmful to plant life comprising applying to the plant life a fungicidally effective amount of O-(N-methylthiocarbamoyl)-hexamethylenimine-2-oxime.

References Cited
UNITED STATES PATENTS
3,249,499  5/1966  Hamden et al. _____ 424—276

SAM ROSEN, Primary Examiner
A. J. ROBINSON, Assistant Examiner

U.S. Cl. X.R.

260—239 BF, 293.85, 326.83; 424—267, 271

UNITED STATES PATENT OFFICE
CERTIFICATE OF CORRECTION

Patent No. 3,780,178    Dated December 18, 1973

Inventor(s) Marvin T. Tetenbaum

It is certified that error appears in the above-identified patent and that said Letters Patent are hereby corrected as shown below:

Column 1, line 20, "on" should be --in--.

Column 2, line 38, "cotnrol" should be --control--.

Column 4, line 51, "Rice blast disease, protectant Piricularia oryzae" should be --Rice plants in fully developed second-leaf growth stage --.

Column 5, line 69, "soi" should be --soil--.

Column 7, claim 1, formula:

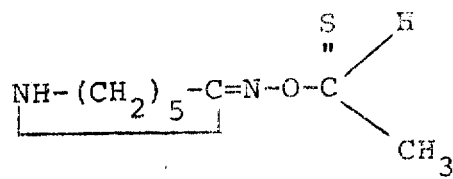

should be:

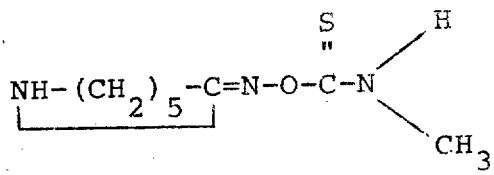

PO-1050
(5/CO)

UNITED STATES PATENT OFFICE
CERTIFICATE OF CORRECTION

Patent No. 3,780,178  Dated December 18, 1973

Inventor(s) Marvin T. Tetenbaum  Page 2

It is certified that error appears in the above-identified patent and that said Letters Patent are hereby corrected as shown below:

Column 8, claim 2, formula:

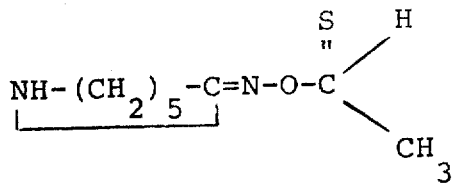

should be:

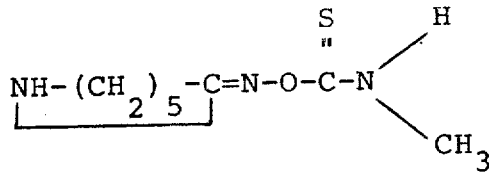

Column 8, claim 3, "fungiharmful" should be --fungi harmful--.

Signed and sealed this 1st day of October 1974.

(SEAL)
Attest:

McCOY M. GIBSON JR.
Attesting Officer

C. MARSHALL DANN
Commissioner of Patents